April 30, 1963  R. A. SCHLESS, JR  3,087,764
MODULAR STORAGE FACILITIES

Filed March 18, 1960  7 Sheets-Sheet 1

INVENTOR
ROBERT A. SCHLESS, JR.

BY Danly + Danly

ATTORNEYS

April 30, 1963  R. A. SCHLESS, JR  3,087,764
MODULAR STORAGE FACILITIES
Filed March 18, 1960  7 Sheets-Sheet 3
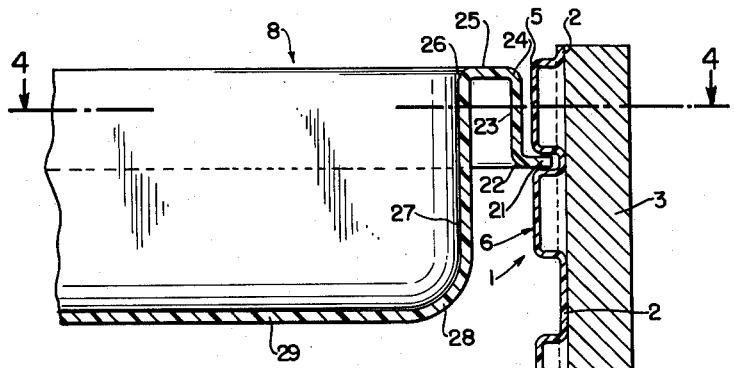
FIG. 3
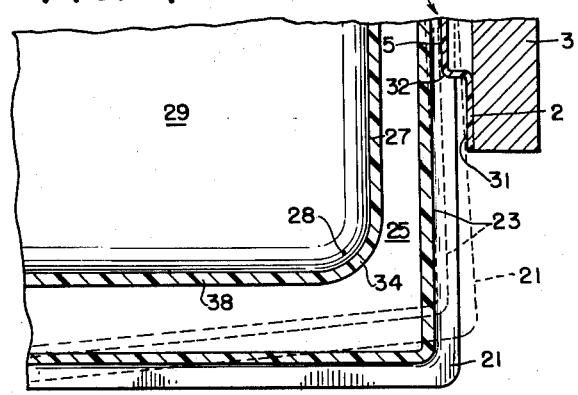
FIG. 4
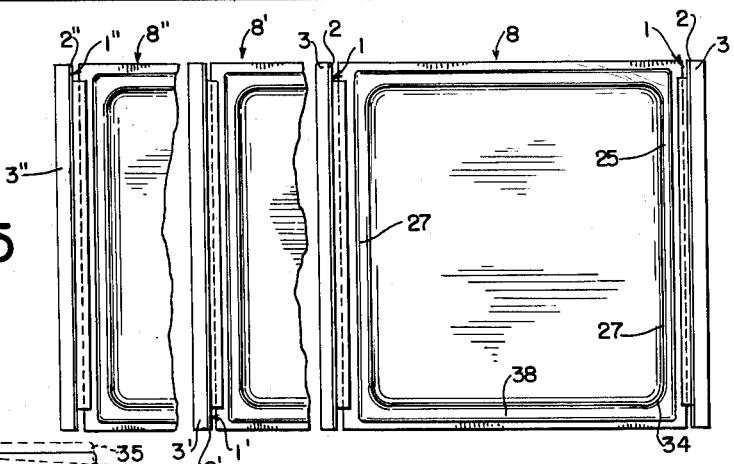
FIG. 5
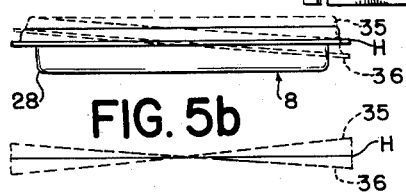
FIG. 5a
FIG. 5b
INVENTOR.
ROBERT A. SCHLESS, JR.
BY Darby & Darby
ATTORNEYS INVENTOR.
ROBERT A. SCHLESS, JR.
BY Darby + Darby
ATTORNEYS April 30, 1963  R. A. SCHLESS, JR  3,087,764
MODULAR STORAGE FACILITIES
Filed March 18, 1960  7 Sheets-Sheet 5
FIG. 10
FIG. 10a
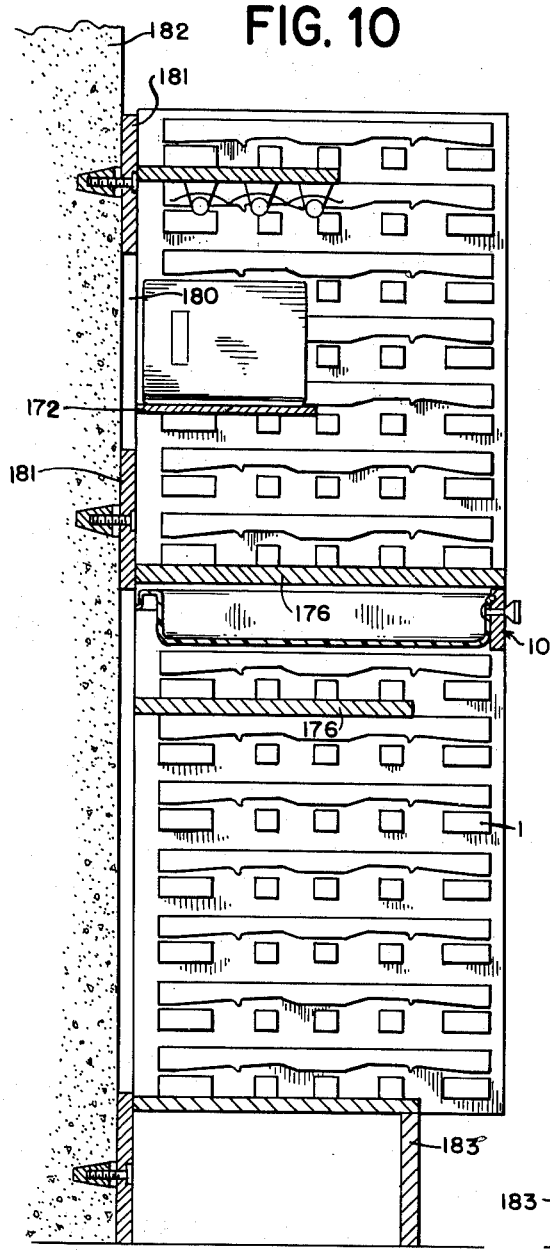
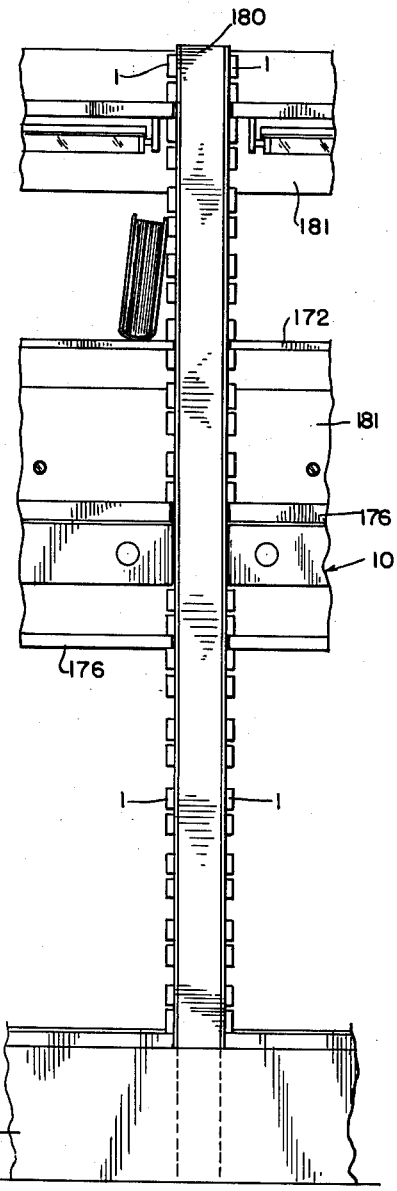
INVENTOR.
ROBERT A. SCHLESS, JR.
BY Darby + Darby
ATTORNEYS April 30, 1963 R. A. SCHLESS, JR 3,087,764
MODULAR STORAGE FACILITIES
Filed March 18, 1960 7 Sheets-Sheet 6

INVENTOR.
ROBERT A. SCHLESS, JR.
BY *Darby & Darby*
ATTORNEYS

April 30, 1963 R. A. SCHLESS, JR 3,087,764
MODULAR STORAGE FACILITIES

Filed March 18, 1960 7 Sheets-Sheet 7

INVENTOR.
ROBERT A. SCHLESS, JR.

BY *Darby + Darby*

ATTORNEYS

United States Patent Office 3,087,764
Patented Apr. 30, 1963

3,087,764
MODULAR STORAGE FACILITIES
Robert A. Schless, Jr., Elizabethstown, N.Y.; Shirley E. Schless and William R. La Flure, executors of said Robert A. Schless, Jr., deceased
Filed Mar. 18, 1960, Ser. No. 16,015
15 Claims. (Cl. 312—107)

This invention relates to constructions, the purpose of which is the storage of articles in drawers and on shelves. The invention provides solutions to a multitude of separate problems in the cost, construction, use and maintenance of storage facilities.

It is an object of the invention to provide a method of eliminating the sticking of furniture drawers, without recourse to conventional space-wasting wooden centerslide constructions, and at less cost than is possible with metal roller bearing construction; and to eliminate the measuring, alignment and fitting of separate sets of individual drawer guides.

It is another object to provide a waterproof construction which will not rot, warp, rust, oxidize, corrode or mildew, and which may be used in any climate and under any natural conditions of heat and humidity.

The invention provides greater simplicity of construction and simplification of parts for built-in storage; and it provides for improvements in drawer design which result in a combination of lightness and strength.

It is another object to provide drawer slides and stops so designed that inexpensive plastics are given the ability to withstand great amounts of wear, and to provide an improved and completely interchangeable system for the support of wood and glass shelves, and plastic drawers.

This application is a continuation in part of my co-pending application, Serial No. 636,087, filed Jan. 24, 1957, now Patent No. 3,023,910, dated March 6, 1962.

The interchangeability provides an improved overall flexibility in the arrangement of storage units containing drawers and shelves, and it provides a general storage system for hospitals and institutions which can be maintained with greater cleanliness at lower cost.

The invention makes possible a system of installation with which an unskilled consumer can simply apply cement to a panel, press it in place manually, and insert drawers and shelves with greater resultant precision than is usual in the work of a conventionally skilled cabinet-maker. The labor-saving and a speed of installation are so great that built-in closed drawer storage can be designed and scheduled by the architect as an integral part of a building construction. The saving in time and money greatly increases the practicality of built-in storage for all buildings, but especially for institutions such as hospitals, schools and dormitories.

Other objects, features and advantages of the invention will appear or be pointed out as the description proceeds.

In the drawings forming a part hereof, like reference characters indicate similar parts in all views:

FIGURE 3 is a fragmentary vertical sectional view, on the line 3—3 of FIGURE 1 and showing how the slide area varies with drawer weight;

FIGURE 4 is a sectional view on the line 4—4 of FIGURE 3, and shows in part how drawer-sticking has been virtually eliminated in this construction;

FIGURE 5 is a diagrammatic plan view showing how various widths of drawers may be interchanged;

FIGURES 5A and 5B are diagrams illustrating features of the design and flexibility of the drawer shown in FIGURE 5;

FIGURE 10 is a vertical sectional view showing a typical construction;

FIGURE 10A is a fragmentary front elevation of the construction shown in FIGURE 10;

Figure 1:
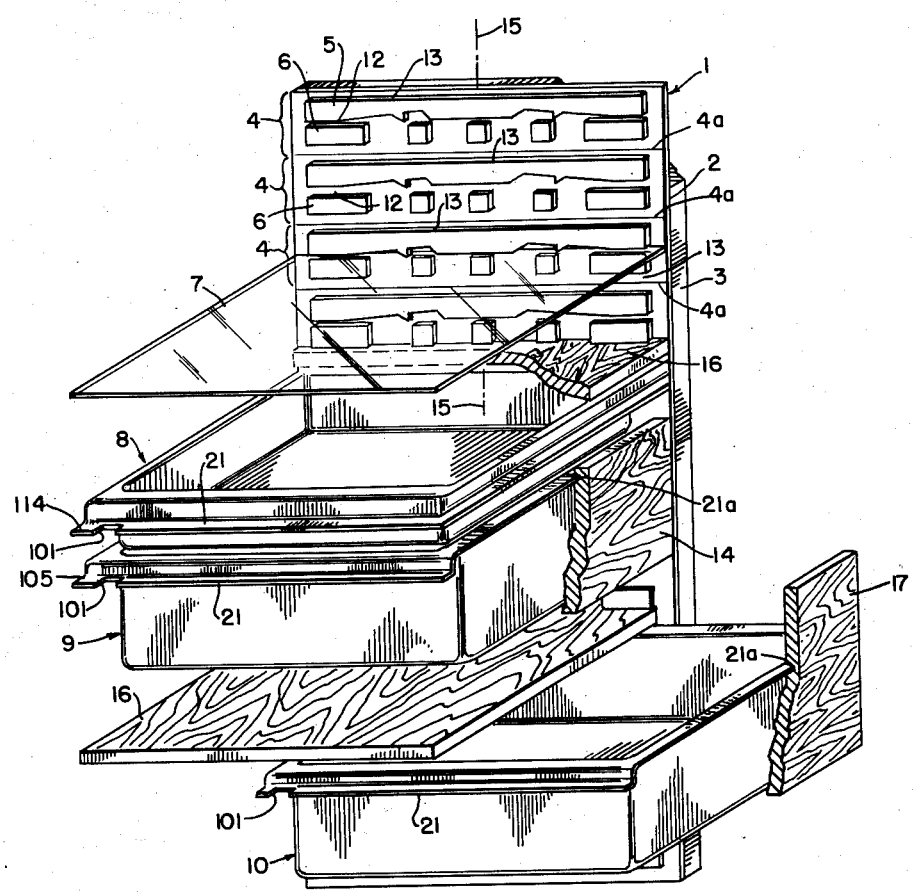
FIGURE 1 is an isometric view showing a panel glued to any stiff backing and supporting molded drawers with and without wood fronts, and wood and glass shelves; the corresponding panel for the near side of the drawers being omitted for clarity.

FIGURE 1 shows a panel of sheet material 1 glued with an industrial contact-type adhesive 2 to any stiff backing 3 which may be wood, plywood, pressed board, plastic, metal, wallboard or an existing wall. It will be seen that the panel is composed of equal vertically repeated areas 4, each containing identical groups of outwardly projecting or raised elements. Each area 4 may be 3" high. The term "vertical module" will be used hereafter when referring to the vertical height of an area 4; and the term "slide group" will be used to refer to the combination of elements on each of the areas 4. It will also be seen in FIGURE 1 that the right and left sides of the panel 1 are symmetrical about a centerline 15, enabling the panel to be used interchangeably to the right and left of drawers, and, further, enabling drawers and shelves to be inserted and withdrawn from both sides of the panel. The horizontal lines 4a between successive areas 4 are module lines, or lines of equal vertical measure, which are molded into or marked upon the panel, marking the juncture between vertical modules. They may constitute weakened lines which allow the panel to be readily fractured, thus separating the adjacent slide groups. For shallow installation where a full panel height is not needed, single or multiple slide groups are cut or broken from a single panel and used to both right and left of drawers and shelves. In each slide group, FIGURE 1, there are flat unraised portions 12 of the panel 1 between the bottom edge of a long projection 5 and the top edge of other projections 6 and these portions 12 may have a height of .200"; while other flat, unraised portions 13 between the bottom of projections 6 and the top of the lower adjacent projections 5 are substantially higher, for example .800". Thus the clearance at the flat portions 12 serves to receive the edges of a glass shelf 7 or Masonite shelves which may be .187" thick, and the edges of plastic drawers 8, 9, and 10, which may be between .120" and .160" thick. The clearance at the flat portions 13 receive the edges of shelves 16, which may be .750" thick. In all the above cases the weights of shelves and drawers and their contents are transferred to the adjacent portions of the panel, and of the projections, and thence dispersed, as will be shown below.

In FIGURE 1, the height of the shallow drawer 8 derives from utilitarian considerations as will be shown below, and the height of a single module derives from the basic drawer height plus other considerations described below. Thus the height of the shallow drawer 8 is related to, but less than, the module. The height of deeper drawer 9 exceeds the height of the shallow drawer 5 by exact multiples of the module. If the module were 3", and the shallow drawer 5 were 2⅝" high, then deeper drawers would be 5⅝", 8⅝", etc.

In addition, both deep and shallow drawers may be used with wood or other fronts 14 and 17 whose height is the same number of modules or a greater number of modules than the nominal drawer height. Because of the practical considerations of mold amortization and material costs, this later combination of the drawer 10 with a higher front 17 provides an economical and practical storage for deep articles such as pots and double boilers at a saving to the consumer. In both of the above examples of the use of wood fronts, continuity of vertical drawer spacing is maintained.

It will be seen that the drawer 8 has a rim 21 around its periphery, which, in addition to structural uses described below serves as a drawer pull, eliminating the necessity of attaching hardware and saving the cost of hardware. Where the drawers are used in conjunction with fronts 14 and 17, the front portion of the rim is cut off, and the remaining flange inserted in a matching groove 21a in the rear of the wood front. The front is glued to the adjacent vertical wall of the drawer, replacing the cutoff section structurally.

In FIGURE 1 it will also be noted that the shelves 16 cover the drawers 8 and 10, keeping out dust and dirt. This combination of drawer and shelf spacing makes possible variable and discontinuous spacing of the drawers, and eliminates the necessity of continuous vertical banks of drawers.

Because the workability of this system of storage derives from the inter-relationship of the parts of both drawers and panels, it will be necessary to describe these parts and their functions in some detail.

In FIGURES 3 and 4, the drawer 8 is molded of plastic material. The flat horizontal rim 21 forms its periphery. From the inside of this rim 21 the material turns upward at curve 22 to a vertical side 23; then curve 24 to a horizontal topside 25, then through curve 26 to a drawer wall 27 and then through a curve 28 to the drawer bottom 29. FIGURE 5 shows that this section continues without structural interruption or weakening around the entire drawer.

In FIGURES 3 and 4, the amount of the radii of the curves 22, 24, 26 and 28, although small, strongly control the structural relationship between the horizontal and vertical areas 21, 23, 25, 27 and 29 in such a manner as to cause these areas to act in part individually, as if pivotally connected in a determinate structure, and in part continuously, as in a welded and indeterminate structure.

When the portions 21, 22, 23, 24, 25, 26, 27, 28 and 29 act as a beam to withstand vertical loads, the drawer bottom 29 and the upper rim 25, and to some extent, the outside flange 21, act as the flanges of a beam, while the vertical portions 23 and 27 act as the web of a beam. When withstanding horizontal thrust, as when a drawer is jammed against the interior of a case, the vertical walls 23 and 27 act as the flanges on a beam, and the horizontal portions 21, 25, 29 act as would the web of a beam. Therefore it can be seen that the portions 21 through 29 are designed to act simultaneously as two structures, at once deflecting and resisting horizontal thrust and at the same time both resisting and deflecting with vertical load, and that the neutral axis about which bending moments and stresses occur must be visualized as duplicate, and that a clear description of the structural uses of the portions 21 through 29, must artificially separate these actions which in reality occur in combination.

Upon loading of the drawer, the stresses are transferred from the bottom surface 29 through the curve 28 to the vertical wall 27 and thence through the curves 26, 24 and 22 to the portions 25, 23 and 21. With an increase in the drawer loading, which may be 10 lbs., the flat portions 25, 23, and to some extent 21, are made to rotate about the curves 26, 24 and to some extent 22, in such a manner that the maximum rotation is manifested by a counter clockwise movement of the flat portion 23, about the curve 24, resulting in an outward movement of the flat surface 21, as shown in the dotted lines in FIGURE 3. This increases the area of contact of the wearing surface of the flange 21 on the projections 6. A slight change occurs in the angle of the flat surface 21 to the horizontal plane. Because the projection 6 is essentially a parallelogram, a compensatory change in the angle of its upper surface occurs.

As a result of these movements, both the major movement by the slide 21 and the extremely slight compensatory movement in the panel projection 6, the unit co-efficient of friction is stabilized to a great extent, since the area of the wearing surfaces have been made to increase in proportion to increases in load. This practical usage of deflection, instead of the destruction of deflection through attempted rigidity has in practice resulted in enormous increases in wear, permitting drawers and panels made of inexpensive plastic materials to be used as long-term installations in institutions. Conventionally, both a drawer and its case are assumed to be rectangular, with adjacent parts parallel, with load fairly equally distributed. The picture is one of a structure which tends to act axially and evenly. However, this convention is essentially untrue because the loading of the drawer, its structure and the friction between the drawer and the surface upon which it slides, are never precisely the same on both sides of the drawer. Also, because the person inserting the drawer cannot in practice push it in precisely at its center. The drawer and case structures herein described are based upon the assumption that their natural tendency, in practice, is not toward even, axial movement, loading and stresses, but rather toward an eccentricity and that a simplification of parts and an efficiency of structure results when, instead of working against the natural tendencies of materials, we recognize and then utilize these tendencies to work to our desired ends.

In the drawer structure already described above, the portions 21-29 are here designed so that, as the drawer assumes the position shown by the dotted lines of positions of 21 and 23 (FIGURE 4) the drawer structure will tend to strongly spring back to a position parallel to the drawer slides, and the drawer will not stick, but slide smoothly in place. This spring-back is caused by two factors. First, the edge 21 bumps against the edge of the slide panel at point 31, and is deflected inwardly toward the drawer wall 27 in a springing action. This allows the vertical edge 23 to press against the vertical surface of the projection 5 of the slide panel at 32, FIGURE 4. Because the points 31 and 32 are not aligned vertically, the edge 21 springs, rotating about the point 32, using a lever arm whose length is the distance between the points 31–32. This lever arm may be approximately .872 inch. As this straightening rotation takes place, it is assisted by the tendency of the portion 23 to spring back into position, forcing itself away from the vertical surface of the projection 5.

It is necessary to point out there that the same portions 21–28 which were made to deflect to increase wearing surface with increased load have been also shown in FIGURE 4 to deflect in another manner in order to eliminate drawer sticking; and that the control of deflection in this structure is the cause of its successful performance.

Experience has shown that with this structure, one can successfully and continuously slide drawers having a width across the face over three times the drawer depth from front-to-back, and that even with this proportion of width to depth, a loaded drawer may be pushed from one corner and will, because of the control of deflection through the above design, right itself and slide into place.

Drawer breakage on impact when a drawer is dropped is an important consideration especially when the drawer is used in dormitories and in factories. This problem has resulted in many attempts to stiffen the drawer. The drawer design shown in the figures herein affords a resiliency which allows the drawer to deflect in a horizontal plane. As has been noted above, the portions 21–29 of the drawer form a compound beam section along each of the four walls of the drawer. The corner curve 34 (FIGURE 5) which may be 1¼" radius, largely controls the transfer of stresses between the adjacent vertical walls of the drawer, as between the sidewall 27 and a front wall 38. Drawers of greater width, but having the same fore-and-aft dimensions, are shown in FIGURE 5 by fragmentary illustration; the drawer of medium width being indicated by the reference character 8' and the widest drawer by reference character 8".

Where the bottom curve 28 (FIGURE 5A) intersects the corner curve 34, a compound curvature is formed at the bottom corner of the drawer. The diameters of these two curves largely control the deflection of the drawer in a horizontal plane H. FIGURES 5a and 5b are diagrammatic views showing deflection of the plane of the bottom of the drawer into twisted positions 35—36. The large diameters of the curves 28 (FIGURE 5a) and 34 (FIGURE 5) transfer impact stresses throughout the structure, allowing the structure temporarily to twist and thus dissipate throughout its parts the strains caused by impact. It should be noted here that the width of the top wall 25, FIGURE 5, substantially increases at the corner with an increase in the diameter of the curve 34, and that one of the functions of the curve 34 is to control the width of the diagonal corner section of the surface 25.

The above deflection in the horizontal plane is also of value in equalizing wear of the drawer on the slide panel, since it allows the drawer to tend to assume that position which will keep all portions of the sliding surface 21 snugly against all other portions of the supporting surfaces of the panel, thus greatly decreasing the tendency toward spotty or localized wear which would occur in a rigid structure.

We have, above, described the drawer and its action separately from the slide-panel. In reality, the design of the parts of these two physical objects is so tightly in balance that it is a matter of very little importance that a specific part is categorized as belonging to the drawer rather than to the panel.

As has been shown above, many portions of the drawer design and structure devolve mainly from the limitations and requirements of the panel. With the parts of the panel, it is even more true that many of its parts are determined almost entirely by the specific physical form and requirements of the drawer.

The slide-panel (FIGURE 1) has been shown to be a vertical succession of repeated areas 4. Because the number of these areas is limited only by practical storage heights, which, in turn, vary widely, the panel may also be described as a ribbon or a roll from which may be clipped any required length of vertical areas 4.

Figure 2:
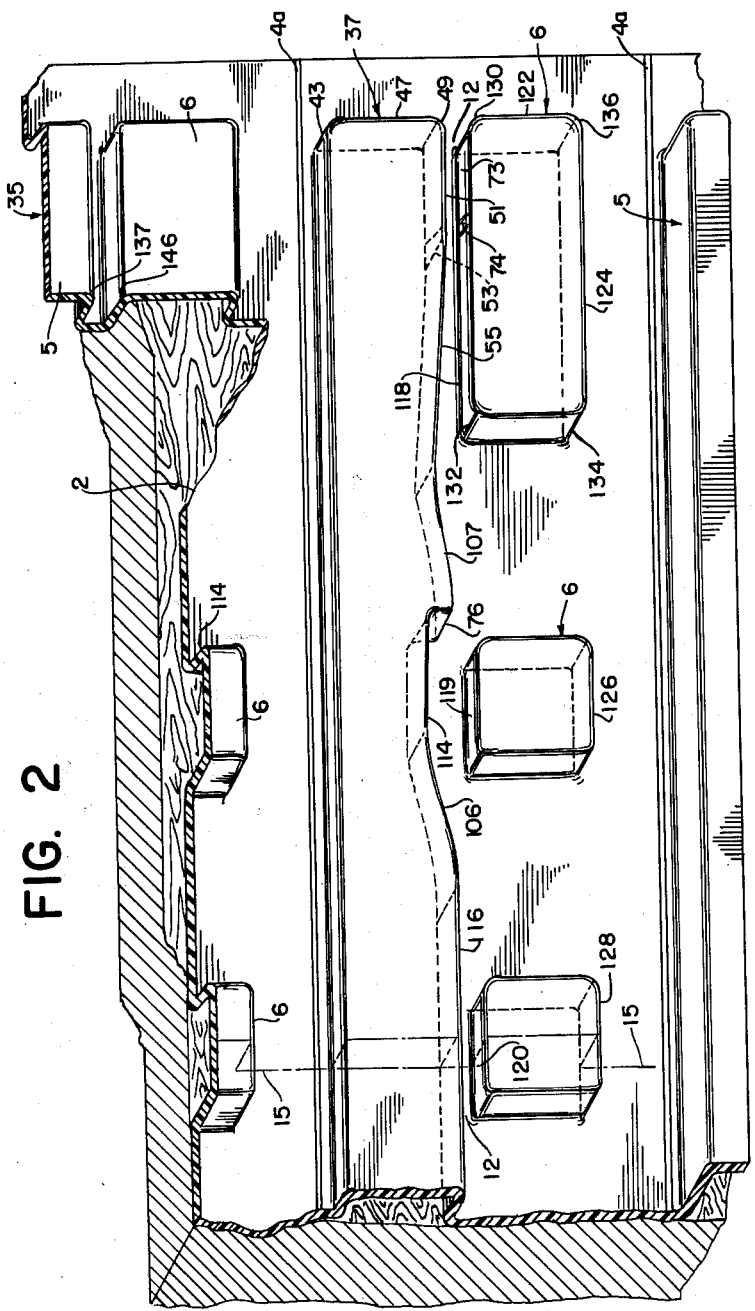
FIGURE 2 is a fragmentary isometric view, partly broken away and in section, of a typical portion of a panel.

FIGURE 2 shows a cut-away section of one slide group 35 and a diagrammatic picturization 37 of a second and similar group. FIGURES 6, 7, 8 and 9 show the successive motions of a drawer in a slide.

Figure 8:
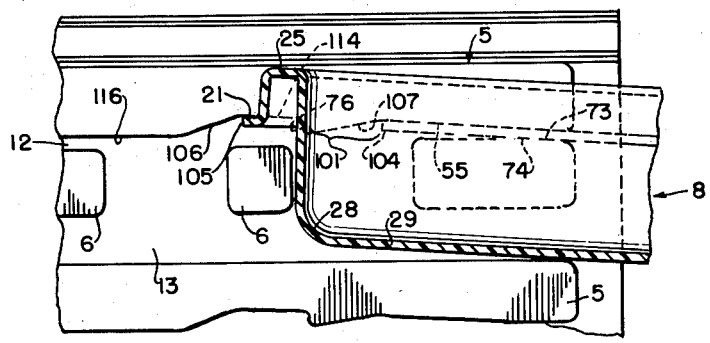

The overall height of one area 4 is dictated by the practical minimum drawer height and the clearance necessary for a tilted drawer (FIGURE 8). In turn, minimum drawer height is dictated both by minimum storage requirements, by the knee room necessary for an average human being seated at a desk 29½" high and by the practical advantage of an even number. In practice, a module height of 3" has been found best for general usage, although 2" and other modules have been used for special applications.

In FIGURE 1, it will be seen that at the top of the panel or at the top of any modular grouping there must be a surface which is not extended forward, in order that the top of the panel be glued to the backing material 3.

It will be seen in FIGURE 8 that a tilting expedient is used as a drawer stop, as will be described below. It has also been shown (FIGURES 3 and 4) that a raised element 5 is necessary to cause the springing action which counteracts drawer sticking.

Therefore, in this design, where the upper surface of the raised portion 5 is used as a shelf support, where the module is predetermined, where the drawer-locking mechanism involves tilting (FIGURE 8) and where the physical shape of the drawer parts 21–29 (FIGURES 6–8) result from structural determinates, the following relationships result:

(1) See FIGURES 2, 6, 7, 8. The height of the raised element 5 is obtained by adding the vertical distance between the top 25 of the drawer and the bottom of the drawer flange 21 to the product of the sine of the angle of tilt times the distance between the rear edge of the drawer and the fulcrum of tilt at 74.

(2) The height of the element 6 is determined by the vertical module less the following: the height of the raised element 5 plus the height of the unraised part 12 between elements 5 and 6, plus the thickness of conventional shelving, which is usually ¾", plus a tolerance to allow the shelving to slide.

The unraised part 12 in which the drawer slides (FIGURE 9) is determined by the thickness 105 of the drawer flange 21. For a drawer edge 105 which may be .120" to .160" thick, the height of the portion of the unraised part 12 may be .200".

The height of the unraised part 13 above the element 5 and below the element 6 of the next higher slide grouping, in which a ¾" wood shelf may slide, may be .800". The height of a module may be 3", the heights of the unraised portions 12 and 13 may total one inch, and the resultant heights of elements 6 and 7 may be 1". These values are given by way of illustration.

In FIGURE 2 the parts shown to the right of the center line 15 are opposite and identical to parts on the left side of 15, and only the right half of the slide grouping is shown. Within this half of a slide grouping, then: the curved surface 43 assists in the introduction of shelves into the panel and serves structurally to transfer stresses caused by the weight of shelves and their contents to the adjacent vertical portion 47. This vertical portion 47 serves also as a stop and abutment for the rear of wood drawer fronts, as they are inserted, arresting the motion of the drawer and aligning the fronts. It serves a bird purpose in partially limiting the amount of air and dust which may enter the space between the wood drawer front and the edge of the panel by abutting against the rear of the wood drawer front. Although not necessary for general use, the portion of the surface 13 which is in line with 47 may be partially brought forward to give more dust protection.

A curved surface 49, below the vertical portion 47 acts to assist drawer insertion by leading the drawer slide 21 into the slot 12 in the panel. A horizontal surface 51, adjacent to the curved surface 49 acts to bring the drawer into a horizontal plane as it is inserted. A curve 53 serves as a transition between the horizontal 51 and an inclined surface 55. The inclined surface 55 is parallel to a sloping surface 73 on top of the front projection 6. They are vertically spaced from one another with relation to the thickness of the edge of the drawer slide 105 (FIGURE 8), along an angle of incline from the horizontal, which angle derives from practical tilting limitations of a withdrawn drawer, visibility requirements of its contents, accessibility of contents, front-to-back depth of the drawer, and the thickness of edge 105.

If we may momentarily refer to FIGURE 8, it will be seen that the drawer-stopping device consists of a notch 101 in the drawer edge 21 which engages a perpendicular surface 76 of hook 107 in the lower portion of the projecting element 5. In order to provide the necessary wear, the tilting of the drawer must be sufficient to allow the flat surface 76 to completely abut the surface 101 of the cut-out in the drawer edge. The amount of the drawer which remains within the case is limited by both the visibility and availability of its contents. The angle of the drawer tilt is limited by the tendency of the drawer contents to slide out of place with excess tilt. The position of the fulcrum surface 73 is determined by factors which will be described below.

The requisite drawer tilt distance necessary for the engagement of the surface 76 against the cut-out 101 is then a function of the sine of the angle of tilt, the amount of drawer extension necessary for accessibility of its contents, and the distance of the rear edge of notch 101 from the back of the flange 105.

The distance of the rear of the notch or cut-out from the rear edge 105 of the drawer is determined by the shearing stresses set up when the rear edge of the notch 101 engages the hook surface 76, since the area behind the notch surface 101 must be sufficient in cross-section to withstand this impact. The aforementioned factors partially determine design and position of the elements we have been examining in FIGURE 2. For clarity, other determinants are described separately below.

Figure 6:
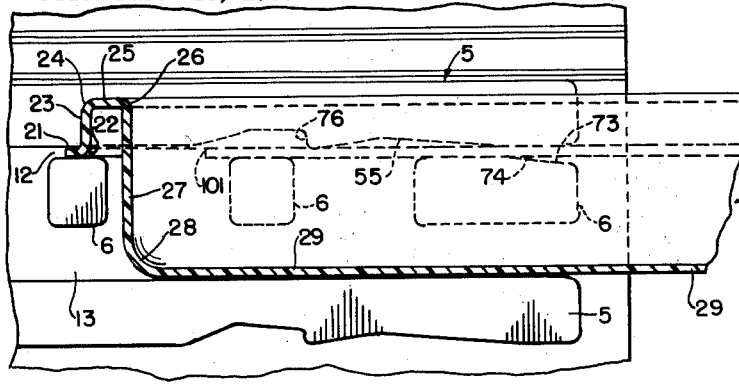
FIGURES 6, 7, 8 and 9 are vertical sectional views showing progressive stages in the removal of a drawer from a panel and showing the functioning and wearing of the parts involved.
Figure 7:
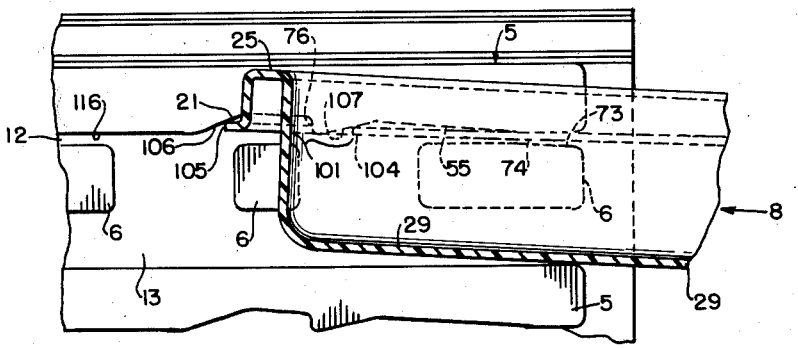

As the drawer is withdrawn to approximately the position shown in FIGURE 6, the weight of the forward part of the drawer will cause it to rotate on the upper end of the surface 73 which acts as a fulcrum. The upper rear edge of the drawer will then begin to bear against the surface 116 of the projection 5 above it. As the withdrawal continues, FIGURE 7, both the rear edge 105 of the drawer and the forward edge 104 of the drawer notch 101 simultaneously engage the curved surfaces 106 and 107 of the projection above them. Thus the distance between similar parts of these two curves must be equal to the distance of the front edge of the cut-out 104 from the rear edge 105 of the drawer.

Then, as a drawer is withdrawn, both the edges 104 and 105 are simultaneously riding against the two curved surfaces above them, substantially reducing the wear on the panel and reducing the bending moment and shearing stresses which would be concentrated upon the edge 105 were edge 104 not operative. This duplication of wearing surfaces has been found mandatory in order to insure the wear required for practical usage of both the drawers and the panels.

By this transfer of stresses away from the rear edge 105 to the edge 104, the distance between 105 and the rear edge of cut-out 101 (see FIGURE 1) is kept to a minimum. That is, the slot 101 is able to be brought to its present rearward position without danger of breaking off the portion of slide 21 immediately behind it. This, in turn, allows the tilted drawer to be sufficiently extended from its case (FIGURE 8) so as to make the contents of the drawer visible and obtainable. This would not otherwise be possible.

As the drawer slides into its final position as shown in FIGURE 8, it becomes parallel to the surfaces 55, 73 and 114, and the edge of the drawer rests along these surfaces, maximizing the wear area, greatly reducing the shock of the impact against the notch 101 and eliminating the bending moment which would otherwise occur. This increases the wear of the material and is partially responsible for the improved results obtained with this invention.

The wear on the surfaces 73 and its curved juncture 74 with the horizontal top surface of the projection 6 is substantially controlled by the curved surfaces 106 and 107 which gradually change the angle of the tilt of the drawer and allows successive portions of the lower surfaces to support the drawer as its tilt increases. That is, the fulcrum gradually moves to the right along the curved surface 74 as the angle of the drawer increases.

Figure 9:
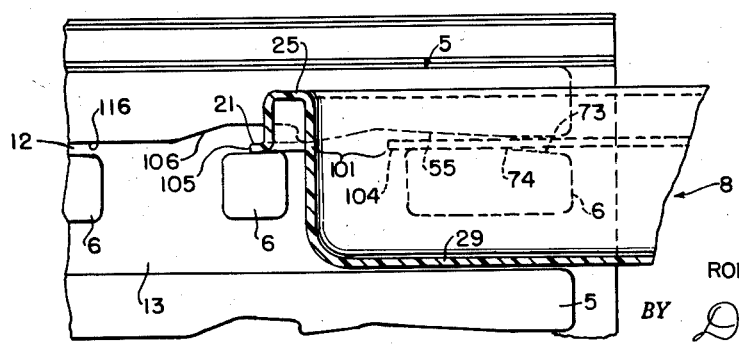

Removal of the drawer is accomplished by simply lifting up its front end to level the drawer as shown in FIGURE 9. This lowers the rear of the drawer, allowing the rearward edge of notch 101 to pass below the hook surface 76 of the drawer stop. The drawer is then readily removed.

Referring again to FIGURE 2, a curve is necessary in order to effect a transition between surface 107 and the flat wearing surface 76. The length of surface 114 is determined by the distance of the drawer notch from its rear edge as has been described above. The surface 116 beyond the curved surface 106 also serves to reduce the drawer tilt and bring it into a horizontal plane.

In FIGURE 2, flat surfaces 118, 119 and 120 vary in area. Both the ease of sliding and long wear depend on keeping as constant as possible a wearing surface operative as a drawer is withdrawn. Within the limitations of a visually acceptable and symmetrical design, the increase of wearing surfaces as a drawer is withdrawn has been retained by the disparity between these areas. The amount of recessed panel between these surfaces, and the fact that they are disparate, has been necessitated in order to eliminate heat buildup in heavily loaded and constantly used drawers. Were there a single long wearing surface here, there would be a heat buildup and a catching of dust in minute particles which would greatly decrease the wear of these bottom surfaces.

A vertical surface 122 on the front of the first projection 6 is similar in function to the surface 47 described above.

The lower surfaces 124, 126 and 128 serve as a top support for a partially withdrawn shelf. Holding the shelf in a horizontal position, they afford it a sufficient rigidity when partially withdrawn to act as a support for a typewriter, as a work surface, a cutting board or a writing surface.

The curves 130, 132, 134 and 136 serve to transmit stresses from the upper and lower horizontal surfaces through the entire rectangular structure of projection 6. In the cut out section 35 of FIGURE 2, the curves 137 through 146 are all used to transmit stresses throughout the plastic structure. The elements 5 and 6 are rectangular in section; so that they afford a movement as a parallelogram in response to loading and shock. In conjunction with the aforementioned curves, shearing tendencies and stress concentrations between surfaces at right angles to each other are controlled, and stresses are brought parallel to the plane of the panel.

The amount of panel surface which extends forward, and its positioning, are determined to a great extent by the amount of area necessary for the adhesive 2 to withstand the adhesive and cohesive requirements of the loaded drawers. Thus, the elements 6 are disparate, so that each is surrounded by a glue area. Because these elements are parallelograms, stresses are transmitted throughout the element, substantially increasing the effective glue area which can absorb these stresses.

The simplicity of construction and versatility of this storage system derives basically from the elimination of the center slide made possible by the smooth sliding action of the drawers in the panels.

FIGURE 5 shows that drawers of various widths may be interchanged so long as the distance between the panels 1 is increased or decreased directly with changes in drawer widths.

Figure 12:
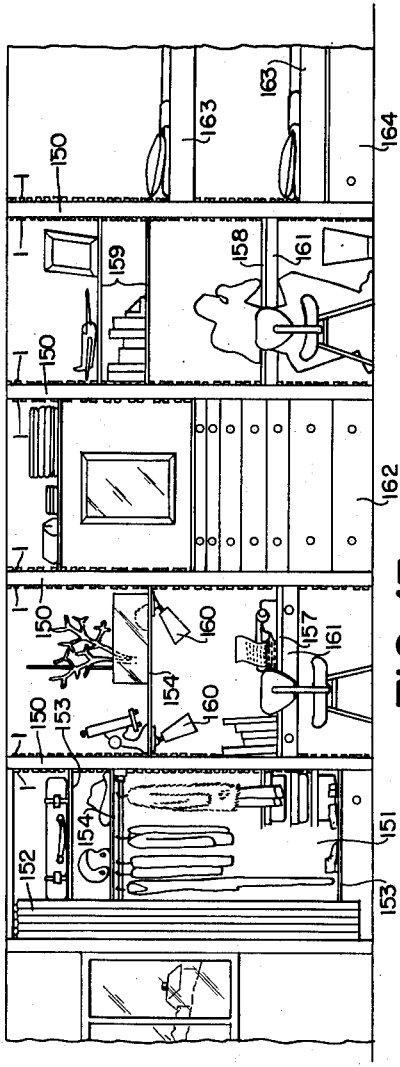
FIGURE 12 shows a dormitory installation.

FIGURE 12 shows a dormitory installation. The panels 1 have been glued to rigid supports 150. Complete interchangeability results. If a closet is desired, as in 151 a door 152 may be affixed in front of the panel and shelves 153 placed at virtually any interval. A bar for hanging clothes 154 may be affixed to the shelves, allowing adjustable height for this purpose. A lower shelf can be inserted for shoe storage. Smaller storage units may be added, using on one side the same panel which lines the closet.

Working surfaces may be built by inserting shelves at various heights. A shelf 157 is at typewriter level while a shelf 158 is inserted at desk level. Storage shelves 159 may be adjusted to suit the open storage needs. Lights 160 attached to these shelves may be adjusted vertically by insertion of the shelves at various levels. A narrow drawer 161 permits storage directly below the working surface, allowing knee-room, as has been previously discussed. Dresser units 162 are made by simply inserting the requisite number of drawers of various heights.

As storage needs increase, more drawers are simply added. Bunks 163 may be supported at any level from the panels. Bedding storage drawers 164 may be slid in below the bunks. Thus a dormitory room designed for single occupancy can be readily converted for double or triple occupancy by the addition of drawers and shelves and bunks.

Figure 13:
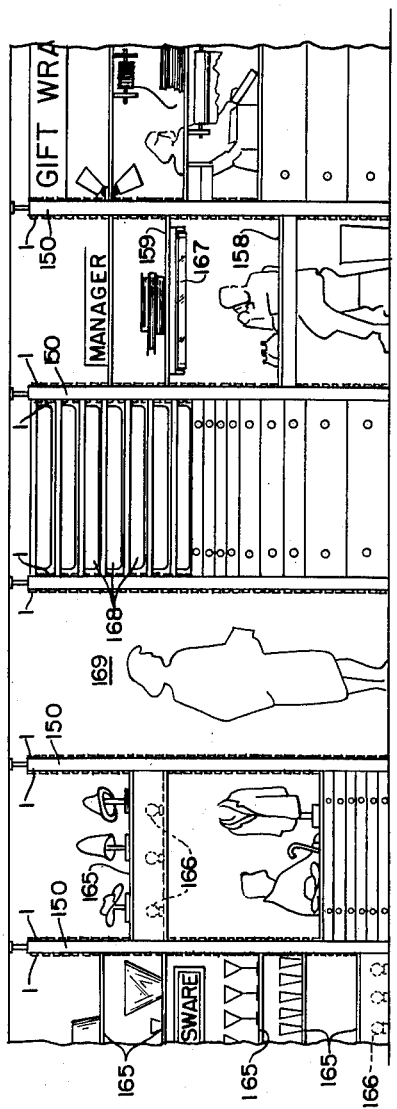
FIGURE 13 shows a retail store installation, and with FIGURE 11 brings out the versatility of this invention with plastic panels, molded drawers and wood and glass shelves offering a practical solution to contemporary storage problems.

FIGURE 13 shows the versatility of this system applied to retail store design. Again the panels have been glued to supports 150 which may or may not be permanent. Supports are spaced at equal intervals in the sketch but may be variously spaced to take various widths of drawers and shelves as shown in FIGURE 5. Glass shelves 165 may be utilized where transparency is of advantage. Drawers or shelves containing lighting units 166 may be used to provide concealed sources of illumination above or below the shelves. Similarly, a wood shelf 159 may contain a lighting unit 167 for working illumination at a desk.

In every case, the illumination may be raised or lowered by changing the shelf position. The top surfaces 158 may be positioned for optimum working height. Drawers without fronts 168 may be used as tote trays for the transport and storage of stock.

By elimination of storage units, a passageway 169 may be made. The versatility of the system can best be described by the fact that the dormitory installation FIGURE 12 could be completely converted into the retail store installation FIGURE 13 in less than one hour, and that any one of the use areas in either drawing could be converted into any other use area, by simply interchanging drawers and shelves.

Figure 11:
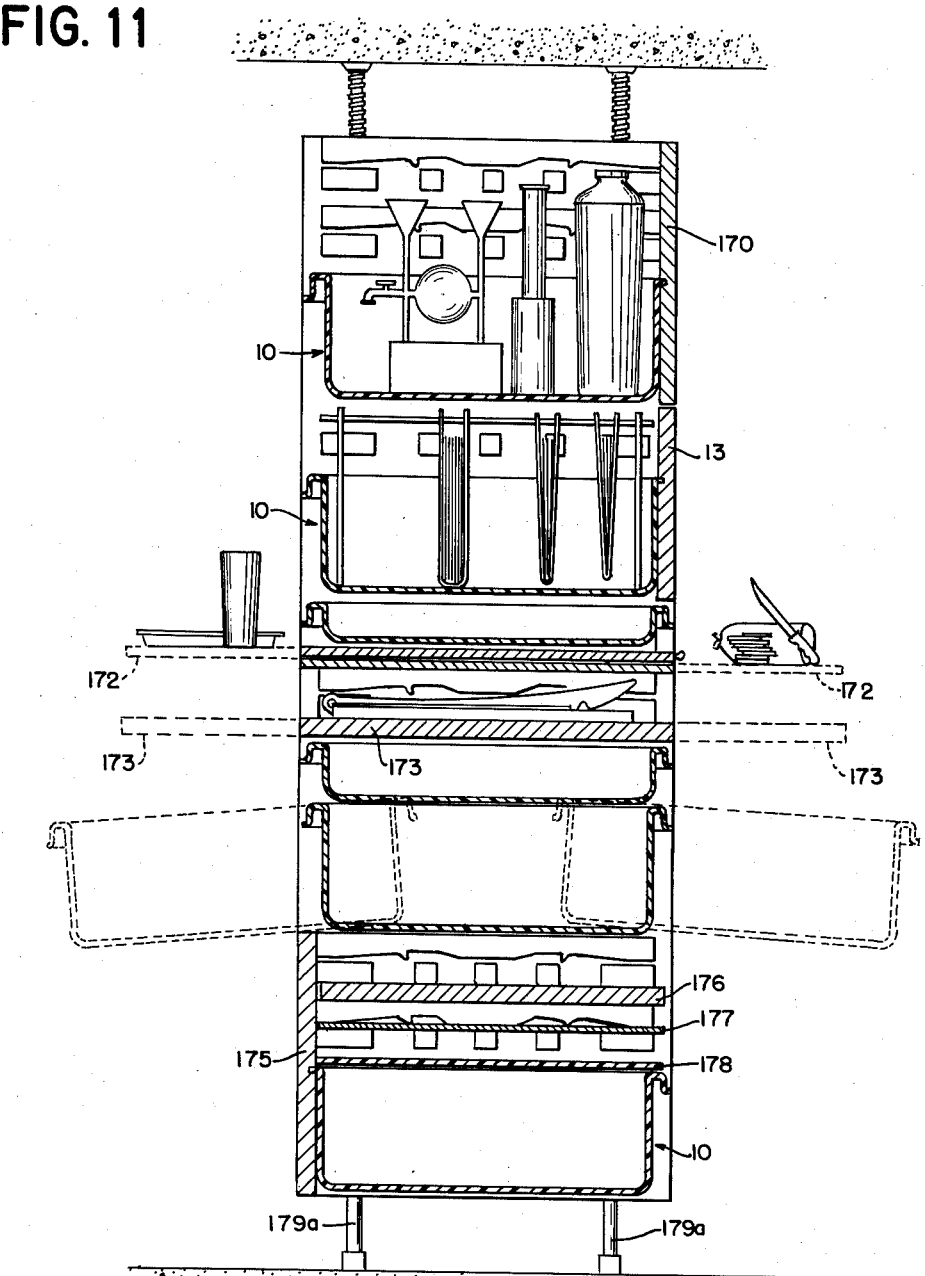
FIGURE 11 is a view similar to FIGURE 10, but showing a modified construction and illustrating various advantages of the installation to the user.

FIGURE 11 shows various uses in the home. The top drawer 10 with the tall front 170 affords very economical storage of tall items such as goblets. The next drawer 10 with the front 13 shows the use of the drawer for hanging file storage. An adjustable shelf height 172 allows the use of the shelf as a cutting board. A similar shelf 173 at a lower level may be used as a snack bar for children. The drawers and shelves may be used from both sides of a unit, such as between a kitchen and a dining room in order to decrease the need for carrying objects from room to room. The bottom drawer 10 with the high front 175 shows the use of wood shelves 176, glass shelves 177 and dust proofing membranes 178, which may be concealed behind a wood front. The unit is supported on legs 179a.

In FIGURE 10 the panels have been affixed to a rigid wood construction whose bottom is cut out and toe plates 183 attached. The panels have been attached to any rigid support 180 whose back has been cut out to let in spacers 181 which are attached to and act as spacers between the rigid supports 180 and are bolted to the wall 182. The kick-plate 183 also acts to keep the rigid supports properly spaced.

Various alternate designs and improvements not shown in the drawings are possible with this system.

For kitchen storage a wider panel may be designed which, when broken down a vertical center line, forms two separate panels for narrow shelf use, while unbroken it serves for deep drawers and shelves.

The preferred construction of the invention has been illustrated and described, but changes and modifications can be made, and some features can be used in different combinations without departing from the invention as defined in the claims.

What is claimed is:

1. A support of drawers, shelves or the like including a panel made of a sheet material with areas of the sheet formed into projections from one side of the panel for a substantial distance beyond the plane of the remainder of the panel, the projections including a plurality of projections spaced from one another along a horizontal row and each of which has a top surface for use as a bearing for a drawer, the projection at one end of the row having a longer bearing surface than others of the projections for withstanding the heavier loading of a partially pulled-out drawer, an upper projection above said row and extending continuously along the row and spaced above the projections of the row to provide running clearance for the edge portion of a drawer, the bottom surface of the continuous projection having a shoulder for limiting outward sliding movement of the drawer, and the panel having a repeated pattern of projections in vertical modules, the said end projection of the row having its top bearing surface horizontal for a portion of its length and sloping downwardly toward the end of the row for another portion of its length to provide a long area of contact with edge portions of a drawer when the drawer tilts downwardly as it is pulled into open position.

2. The support described in claim 1 and in which the bottom surface of the continuous projection has an upwardly inclined surface leading to a shoulder for accommodating a rise in the rearward end of a drawer as said drawer tilts downwardly when pulled into open position.

3. The support described in claim 2 and in which the bottom surface of the continuous projection has two upwardly inclined surfaces along its bottom and each in position to contact simultaneously with a different part of the drawer to distribute any wear of the panel by friction against the rearward portion of the drawer.

4. A support of drawers, shelves or the like including a panel made of a sheet material with areas of the sheet formed into projections from one side of the panel for a substantial distance beyond the plane of the remainder of the panel, the projections including a plurality of projections spaced from one another along a horizontal row and each of which has a top surface for use as a bearing for a drawer, the projection at one end of the row having a longer bearing surface than others of the projections for withstanding the heavier loading of a partially pulled-out drawer, an upper projection above said row and extending continuously along the row and spaced above the projections of the row to provide running clearance for the edge portion of a drawer, the bottom surface of the continuous projection having a shoulder for limiting outward sliding movement of the drawer, and the panel having a repeated pattern of projections in vertical modules, the panel being made of stiffly flexible plastic and the projections being of generally rectangular cross section in vertical planes with short radius curves at the corners of the projections for distributing loadings on the bearing surfaces of the projections to the other portions of the panel and through said panel to a wall or other vertical support to which the panel is attached on the side away from the projections.

5. The support described in claim 1 and in which there is a drawer with a supporting flange that extends between the row of projections and the continuous projections, the vertical height of the continuous projection being substantially equal to the vertical distance between the top of the drawer and the bottom of the flange, plus the sine of the angle of tilt of the drawer when open, times the distance between the rearward edge of the drawer and the fulcrum of the tilt.

6. A support of drawers, shelves or the like including a panel made of a sheet material with areas of the sheet formed into projections from one side of the panel for a substantial distance beyond the plane of the remainder of the panel, the projections including a plurality of projections spaced from one another along a horizontal row and each of which has a top surface for use as a bearing for a drawer, the projection at one end of the row having a longer bearing surface than others of the projections for withstanding the heavier loading of a partially pulled-out drawer, an upper projection above said row and extending continuously along the row and spaced above the projections of the row to provide running clearance for the edge portion of a drawer, the bottom surface of the continuous projection having a shoulder for limiting outward sliding movement of the drawer, and the panel having a repeated pattern of projections in vertical modules, the continuous projection of one module being spaced below the bottoms of the projections of the row of the next module above by a distance sufficient to receive a shelf that can be supported by the panel above a drawer which is supported by the row of projections.

7. The support described in claim 6 and in which the vertical height of the projections is substantially equal to the vertical height of a module panel less the sum of the vertical height of the continuous projection, the vertical clearance between the continuous projection and the projections of the row, and the height required for the shelf with clearance for the shelf to slide.

8. The support described in claim 6 and in which there are two similar panels parallel to one another and rigidly supported against vertical supports, and there is a drawer with flanges extending from its opposite sides into the space between the continuous projections and the projections of the row of at least one of the modules of each panel, and there is a shelf with its opposite end portions extending into the clearance between a continuous projection of one module and the next row of projections of the next module of both panels.

9. The combination with spaced parallel supports for receiving the supporting flanges of a drawer, and a plastic drawer having outwardly extending flanges extending into clearances between bearing surfaces on the spaced supports, the drawer being made of stiffly flexible plastic material which will yield or warp as necessary to prevent jamming of the drawers when they become obliquely positioned between the supports, the drawer including a bottom, side walls extending upwardly from the bottom and of one piece therewith and merging with the bottom along a curved region of juncture, the flanges of the drawer being also of one piece construction with the bottom and sides and being located intermediate the top and bottom of the side walls and joined to the tops of the side walls by upwardly extending extensions of the flanges which merge with the said walls along a curved region having an arc of curvature of about 180°.

10. The combination described in claim 9 and in which the drawer has four side walls and each of the side walls has a similarly curved top region and a portion extending downwardly from the top region.

11. The combination described in claim 9 and in which there are openings through the curved top portions of the drawer at opposite sides thereof and near the rearward end of the drawer to provide a surface at the back of each opening for engaging a shoulder located above the support on which the drawer slides to limit opening movement of the drawer.

12. A furniture component comprising a drawer made of resilient plastic material and having a bottom, a front, back and side walls, all of one-piece construction, a lip around the upper ends of the walls and extending downwardly along the slide walls, ridges extending outwardly from the lower ends of the downwardly extending lips at both sides of the drawer and at a level below the top of the drawer, the lip at the front wall also extending downwardly and having a portion shaped to serve as a pull for the drawer, and a filler piece held at its upper end by the lip along the front wall, said insert extending downwardly below the lip and across the front wall of the drawer to the level of the bottom of the drawer, the lips and ridges being of one-piece construction with the walls of the drawer.

13. A furniture component comprising a drawer made of resilient plastic material and having a bottom, a front, back and side walls, all of one-piece construction, a lip around the upper ends of the walls at which the front, back and side walls curve outwardly and then downwardly substantially parallel to the inner upwardly extending portion of the walls, and a rim extending outwardly from the lower ends of outer downwardly extending portions of the walls, the rim being at substantially the same level on the side and back walls of the drawer, the plastic material being resilient so that the rim can twist as necessary to prevent binding of the drawer when located obliquely in a drawer slide.

14. The furniture component described in claim 13 and in which the bottom merges with the side and back walls along curves, and the bottom walls and rim of the drawer are sufficiently flexible for the entire drawer to twist into a warped condition with respect to a horizontal plane before the drawer can jam in its supporting structure when shifted into an oblique position with respect to its supporting structure.

15. The combination of a drawer having outwardly extending rims at opposite sides for supporting the drawer, guides at opposite sides of the drawer and into which the rims extend, each of the rims having a notch in it toward the back of the drawer, and each of the guides having a top portion above the rim that slides in that guide, the top portion of the guide having two sloping surfaces at spaced regions along its length, which sloping surfaces are of similar slope and one of which is in position to serve as a bearing for the rearward end of the rim, and the other of which is in position to serve simultaneously as a bearing for the front edge of the notch when the front end of the drawer is partly pulled out and the drawer tilts downwardly to bring the rearward portion of the drawer up against the top of the guide.

References Cited in the file of this patent

UNITED STATES PATENTS

| 1,489,405 | Wheary | Apr. 8, 1924 |
| 1,496,099 | O'Connor | June 3, 1924 |
| 1,513,429 | Schmitz | Oct. 28, 1924 |
| 1,905,857 | Hamilton | Apr. 25, 1933 |
| 2,101,582 | Hoff | Dec. 7, 1937 |
| 2,168,172 | Rees | Aug. 1, 1939 |
| 2,342,956 | Mills | Feb. 29, 1944 |
| 2,487,356 | Meiners | Nov. 8, 1949 |
| 2,539,963 | Moberg | Jan. 30, 1951 |
| 2,565,784 | Sheean | Aug. 28, 1951 |
| 2,646,333 | Abrahamson | July 21, 1953 |
| 2,763,526 | Falek | Sept. 18, 1956 |
| 2,839,349 | Culver | June 17, 1958 |